United States Patent [19]

Condon et al.

[11] Patent Number: 5,536,545
[45] Date of Patent: *Jul. 16, 1996

[54] THREE DIMENSIONAL SIGNAGE AND A METHOD OF MAKING

[75] Inventors: Robert R. Condon, Woodbury; Daniel P. Pohl, Oakdale; Frank T. Sher, St. Paul, all of Minn.

[73] Assignee: Minnesota Mining and Manufacturing Company, St. Paul, Minn.

[ * ] Notice: The term of this patent shall not extend beyond the expiration date of Pat. No. 5,384,413.

[21] Appl. No.: 443,476

[22] Filed: May 18, 1995

Related U.S. Application Data

[60] Division of Ser. No. 213,181, Mar. 14, 1994, and a continuation-in-part of Ser. No. 55,187, Apr. 28, 1993, Pat. No. 5,389,413.

[51] Int. Cl.⁶ .................................................. B32B 9/00
[52] U.S. Cl. ............................ 428/40; 428/157; 428/161; 428/187; 428/185; 428/203; 428/213; 428/315.5; 428/315.9; 428/331; 156/240; 156/299; 156/556; 40/594; 40/596; 40/615; 40/616
[58] Field of Search ...................... 428/161, 157, 428/40, 203, 185, 187, 213, 331, 315.5, 315.9, 195; 156/299, 240, 556, 248, 247, 245; 40/596, 615, 616, 594

[56] References Cited

U.S. PATENT DOCUMENTS

| | | | |
|---|---|---|---|
| 2,011,762 | 8/1935 | Henry | 40/126 |
| 2,859,152 | 11/1958 | Markus et al. | 154/116 |
| 3,130,101 | 4/1964 | Gittins et al. | 156/163 |
| 4,052,241 | 10/1977 | Walter | 156/245 |
| 4,230,513 | 10/1980 | Cugini, Sr. et al. | 156/299 |
| 4,295,275 | 10/1981 | Cugini, Sr. et al. | 33/1 G |
| 4,414,731 | 11/1983 | Riemer | 29/453 |
| 4,474,725 | 10/1984 | Sands | 264/510 |
| 4,522,914 | 6/1985 | Brooks, Jr. | 430/320 |
| 4,539,256 | 9/1985 | Shipman | 428/315.5 |
| 4,585,684 | 4/1986 | Mackarous | 156/213 |
| 4,677,010 | 6/1987 | Selwyn | 428/40 |
| 4,714,581 | 12/1987 | Witt | 264/553 |
| 4,737,224 | 4/1988 | Fabbrini | 156/240 |
| 4,804,572 | 2/1989 | Bobrogi | 428/203 |
| 4,833,172 | 5/1989 | Schwartz et al. | 521/62 |
| 4,837,956 | 6/1989 | Dolence | 428/203 |
| 4,871,992 | 10/1989 | Petersen | 340/407 |
| 4,921,755 | 5/1990 | Carroll, Jr. et al. | 428/328 |
| 4,976,896 | 12/1990 | Short et al. | 264/1.9 |
| 5,000,903 | 3/1991 | Matzinger et al. | 264/511 |
| 5,034,077 | 7/1991 | Pata | 156/84 |
| 5,098,633 | 3/1992 | Hawler | 264/511 |
| 5,152,861 | 10/1992 | Hann | 156/230 |
| 5,162,124 | 11/1992 | Hausler et al. | 425/384 |
| 5,240,539 | 8/1993 | Gunzelman et al. | 156/248 |
| 5,246,757 | 9/1993 | Condon et al. | 428/40 |
| 5,346,571 | 9/1994 | Condon et al. | 156/212 |
| 5,389,413 | 2/1995 | Condon et al. | 428/40 |

*Primary Examiner*—Patrick J. Ryan
*Assistant Examiner*—Abraham Bahta
*Attorney, Agent, or Firm*—Gary L. Griswold; Walter N. Kim; Carolyn V. Peters

[57] ABSTRACT

A 3-D graphic sign construction is provided comprising: (a) a conformed laminate comprising a sign face layer, one or more visual characters, a background color layer, and (b) one or more 3-D characters positioned in register with the visual characters and a method of make the same.

10 Claims, 2 Drawing Sheets

THREE DIMENSIONAL SIGNAGE AND A METHOD OF MAKING

CROSS-REFERENCE TO RELATED APPLICATION

This is a division of application No. 08/213,181 filed Mar. 14, 1994, which is a continuation-in part of U.S. Ser. No. 08/055,187, filed Apr. 28, 1993, now U.S. Pat. No. 5,389,413 and incorporated herein by reference.

TECHNICAL FIELD

This invention relations to three dimensional signage particularly to three dimensional signage use for display of textural and decorative relief and a method of making architectural signage.

BACKGROUND OF THE INVENTION

Current methods to produce 3-D custom signs includes industrially dedicated technologies such as sandblasting, acid-etching, routing, injection molding, photoemulsion, or thermoforming vacuum molding processes. However, these processes have limitations for sign companies for a variety of reasons including capital investment, required technical expertise, difficulty and expense of a set-up for one-of-kind sign, as well as limitations in design, color, fonts, etc. Some processes, such as acid-etching, injection molding, and vacuum forming require wet chemical, molten processes or very high processing temperatures. Furthermore, process limitations, such as time-consuming and costly tooling and critical registration techniques for font and layout design (injection molding, vacuum forming), require mass produced quantities offering severely restricted design choice (color, font, layout) to the graphic designer.

Other processes that provide some degree of custom color selection typically can require critical registration techniques, or application of abradable or chippable color layers to the sign face. Many of these processes preclude integration of correctly formed Braille dots as a visually appealing part of the sign face.

In vacuum thermoforming processes, both male and female molds are used in the industry. These molds are usually reused for multiple copies. The molds do not become part of the finished sign. While backfilling of the hollow characters with a foam or other liquid resin is possible, most thermoformed signs are backlit and retain hollow characters.

Some processes use a protective overlay film around applied raised graphic characters with minimal air entrapment. While offering the latitude of electronic-cut font generation capabilities, there are limitations in the capabilities to address the visual quality of the cut raised letters, color design selection, hardness, and handling durability. However, there does not presently exist an economic means for providing 3-D signs in limited quantities or custom designs having a wide latitude of design as for flat signage construction.

Recently, the Federal Government has adopted the Americans with Disabilities Act (ADA) that requires architectural signage in all buildings and places accessible by the public to contain letters, numerals, and Braille characters that are raised off the surface of the sign. The Act specifies that the characters be raised at least 32 mils above their supporting surface, so as to be easily distinguished, even by touch by a disabled person. In addition to complying with the new legislation, the sign should also look aesthetically pleasing and be durable under heavy use conditions.

SUMMARY OF THE INVENTION

Briefly, in one aspect of the present invention a 3-D graphic sign construction is provided comprising:
 (1) a sign face layer,
 (2) one or more visual characters,
 (3) a background color layer, and
 (4) one or more 3-D characters positioned in register with the visual characters, wherein an adhesive layer can be added between (a) the sign face layer and the visual characters, (b) between the visual characters and the background color layer, (c) the background color layer and the 3-D characters positioned in register with the visual characters, or (d) any combinations of (a), (b) and (c).

In this first embodiment, both the sign face layer and the background color layer are conformable plastic films. All the layers and characters can be pressure sensitive adhesive (PSA) coated plastic materials.

In another embodiment, a 3-D graphic conformed sign laminate is provided comprising:
 (1) a sign face layer,
 (2) one or more visual characters,
 (3) one or more 3-D characters positioned in register with the visual characters, and
 (4) a background color layer, wherein an adhesive layer can be added between (a) the sign face layer and the visual characters, (b) between the visual characters and the 3-D characters positioned in register with the visual characters, (c) the 3-D characters and the background color layer, or (d) any combinations of (a), (b) and (c).

In this alternative embodiment, only the sign face layer need be conformable plastic film, although the other materials used in the present invention may be conformable materials. As in the first embodiment, it is preferable that the layers and characters PSA coated plastic materials. In both embodiments, the sign face layer is a transparent conformable film, although this is not required.

In yet another embodiment, a 3-D raised graphic sign is provided comprising in sequence:
 (a) a sign face layer;
 (b) one or more visual alphanumeric and design characters;
 a first background layer;
 one or more 3-D characters having a minimum height of approximately 10 mils and positioned in register with the visual characters; and
 (e) a second background layer.

As in the first and second embodiment, it is also contemplated to include adhesive layers between the various members of the sign face graphic.

Furthermore, other embodiments of the present invention could include other hydrid constructions of the above-described embodiments.

In another aspect of the present invention, processes for making the 3-D graphic signs are provided comprising the steps of:
 (1) providing one or more visual alphanumeric and design characters, such as by reverse cutting techniques;
 (2) providing one or more 3-D characters using the same font, style and spacing and with similar dimensions as the visual characters that are to be raised, such as by reverse cutting techniques;

(3) applying the visual characters to a second surface of a sign face layer;

(4) applying a background color layer over the applied visual characters on the same second surface of the sign face layer as the visual characters effectively sandwiching the visual characters between the second surface of the sign face layer and the first surface of the background color layer;

(5) applying the 3-D characters onto the background film in registration with the outline of the visual characters;

(6) positioning the laminate of step 5 onto a vacuum table, wherein the first surface of the sign face layer is away from the surface of the vacuum table and then applying a vacuum to the table; and (7) applying heat to the laminate, until the background color layer, sign face layer, and optionally the visual characters (if cut larger than the 3-D characters) have conformed around the 3-D characters.

To prepare the alternative embodiment, the background film of step 4 is applied to the second surface of the sign face layer after the visual characters and 3-D characters have been applied to the second surface of the same sign face layer and conformed, effectively sandwiching the alphanumeric characters (visual characters and 3-D characters) between the second surface of the sign face layer and the first surface of the background film. This alternative process has a number of processing advantages, such as reverse cutting one or more alphanumeric and design characters from a laminate comprising: (a) a color layer (visual characters prior to cutting), and (a) a 3-D material layer (3-D characters prior to cutting).

The processes of the present invention overcome many of the limitations of art known systems. The present invention offers a number of improvements and advantages including: (1) font variety afforded by electronic cutters; (2) capability of fine definition, high quality small font sizes (for room signs, etc.); (3) excellent visual quality of characters; and (4) one or few of a kind custom layout capabilities including contrast effects between characters and background formerly associated only with electronic cut generated flat signs. Such contrast effects include: large color selection and color consistency; reflectivity; translucency; metallic effects; marble, wood grain, and other patterns; and different tactile contrasts of three dimensional characters; (5) textured background capabilities; (6) simple, low cost processing equipment; (7) safer, lower processing temperatures that can also allow improved gloss control; (8) very fast processing times as compared to art known methods to fabricate 3-D signs; (9) excellent conformability around 3-D characters with minimal air entrapment; (10) hardness and durability afforded by unitized (uni-construction) plastic sign face; (11) integrated Braille capabilities and Braille dots with desirable tactile qualities; and (12) capabilities to meet ADA requirements.

As used in this application:

"3-D characters" refer to alphanumeric or pictorial characters that provides the three dimensionality of the visual character relative to the background and is fabricated from a thick, 3-D material, typically by CAD/CAM cutting and such 3-D characters may be fabricated using one or more layers of 3-D material, may be 3-D laminate characters, or any combinations thereof;

"3-D laminate character" refers to the alphanumeric or pictorial character that comprises the visual character layer and the 3-D character layer bonded together at the interface of these two layers;

"3-D material" refers to the material from which the 3-D characters are fabricated;

"cuttable" refers to the capability of being cut with art known means of cutting vinyl-like or filled rubber like material, such as computer assisted (CAD/CAM) electronic film cutters or hand cutters;

"first surface" refers to the side of a layer that will face the viewer under typical viewing of the finished sign;

"handling durability" refers to the resistance of the 3-D sign to rough handling such as picking or impressing the surface with a fingernail, a pencil or the like;

"raised characters" refers to the alphanumeric or pictorial characters that are raised or recessed on the finished sign face construction;

"second surface" refers to the side of a layer that will face away from the viewer under typical viewing of the finished sign;

"unitized" refers to the surface rigidity of an entire sign face and raised characters afforded by one piece of material, uni-construction, encased;

"vertical cut" refers to a cut essentially perpendicular to the surface through the thickness of a thick cuttable film; and "visual characters" refer to alphanumeric or pictorial characters that visually contrast, typically by differential coloration with background.

DESCRIPTION OF THE PREFERRED EMBODIMENT(S)

Figure 1:
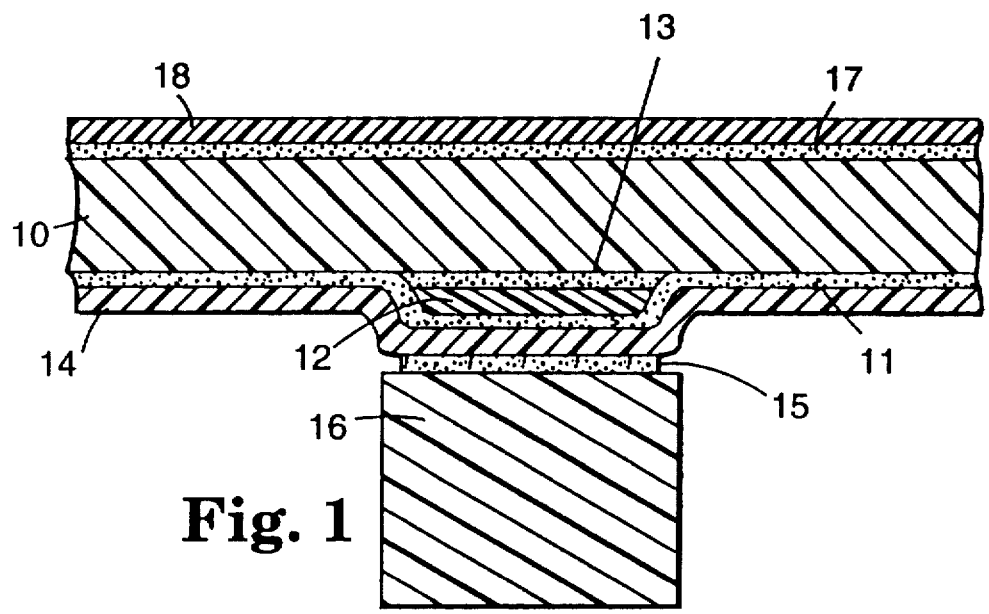
FIG. 1 is a cross-sectional view of a sign face construction with an alphanumeric character of a 3-D sign of an embodiment of the present invention prior to being thermally conformed.

Referring now to the drawing, FIG. 1 illustrates a sign face layer (10) having an alphanumeric or pictorial visual character (12) adhesively fastened (adhesive layer 13) and a background color layer (14) adhesively fastened (adhesive layer 11) to the second surface of sign face layer (10). Optionally, surface layer (18) is adhesively fastened (adhesive layer 17) to the first surface of sign face (10). A PSA-backed alphanumeric or pictorial 3-D character (16) is positioned in registration with first cut visual character (12) and adhesively fastened (adhesive layer 15) to the second surface of background color layer (14). The sign face layer (10) and remaining layers (12, 14 and 18) are then thermally conformed around 3-D character (16) to produce the 3-D sign illustrated in FIG. 2.

Figure 3:
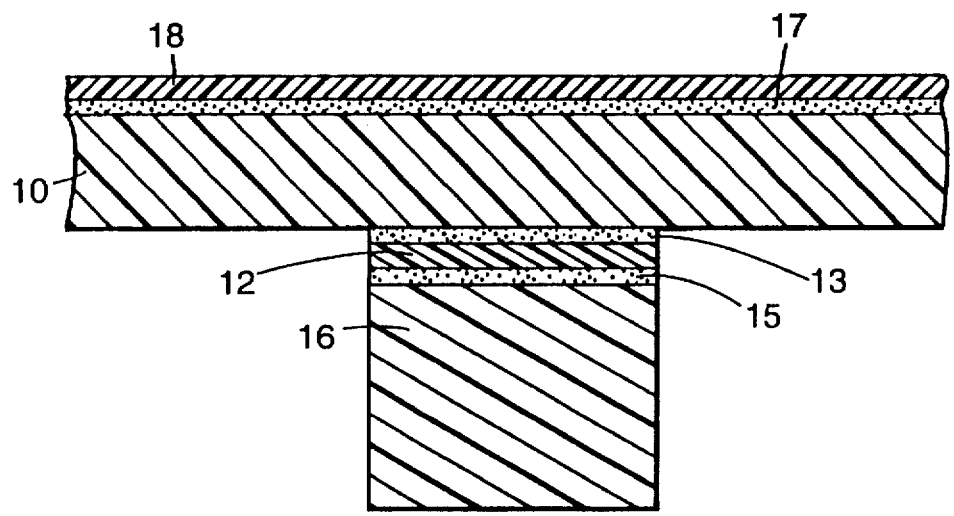
FIG. 3 is a cross-sectional view of a sign face construction with an alphanumeric character of a 3-D sign of an alternative embodiment of the present invention prior to being thermally conformed.

FIG. 3 illustrates an alternative embodiment of the 3-D graphic sign wherein the sign face layer (10) is adhesively fastened (adhesive layer 13) to the first surface a laminate consisting of alphanumeric or pictorial visual character (12) and adhesively fastened (adhesive layer 15) 3-D character (16). Optionally, surface layer (18) is adhesively fastened (adhesive layer 17) to the first surface of sign face (10). The sign face layer (10) and remaining layer (18) are then thermally conformed around 3-D character (16) to produce raised characters. The background color layer (14) is adhesively fastened (adhesive layer 11) to the second surface of the sign face layer (10) and 3-D character (16) to produce the 3-D sign illustrated in FIG. 4.

Figure 2:
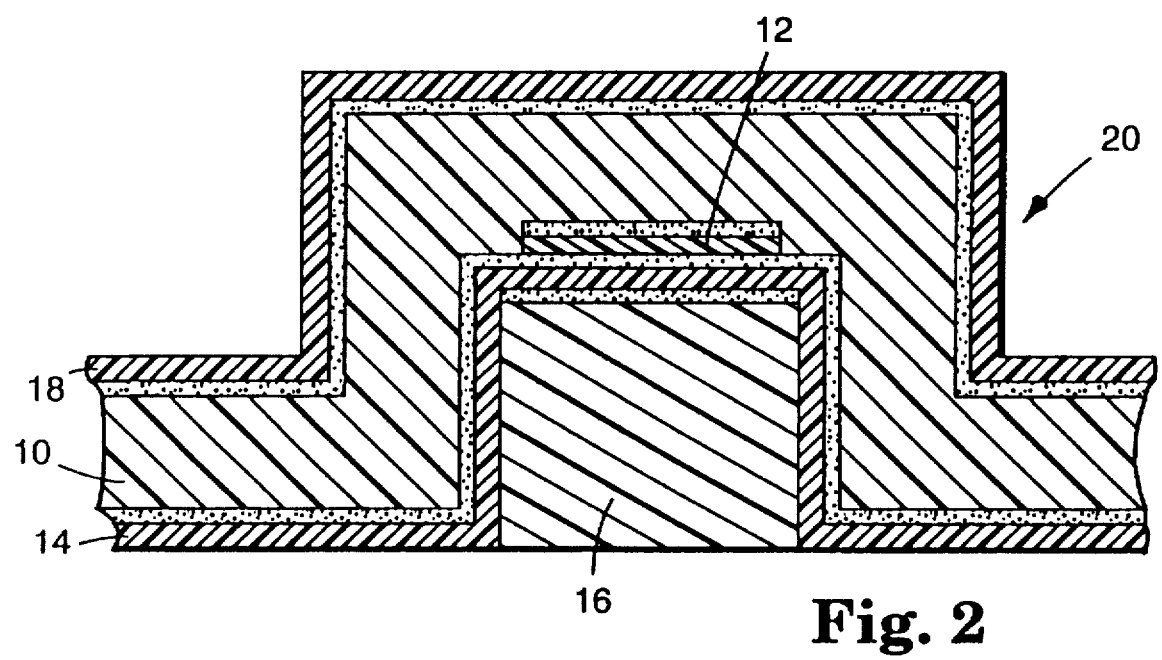
FIG. 2 is a cross-sectional view of the sign face construction with the alphanumeric character of FIG. 1 after being thermally conformed.
Figure 4:
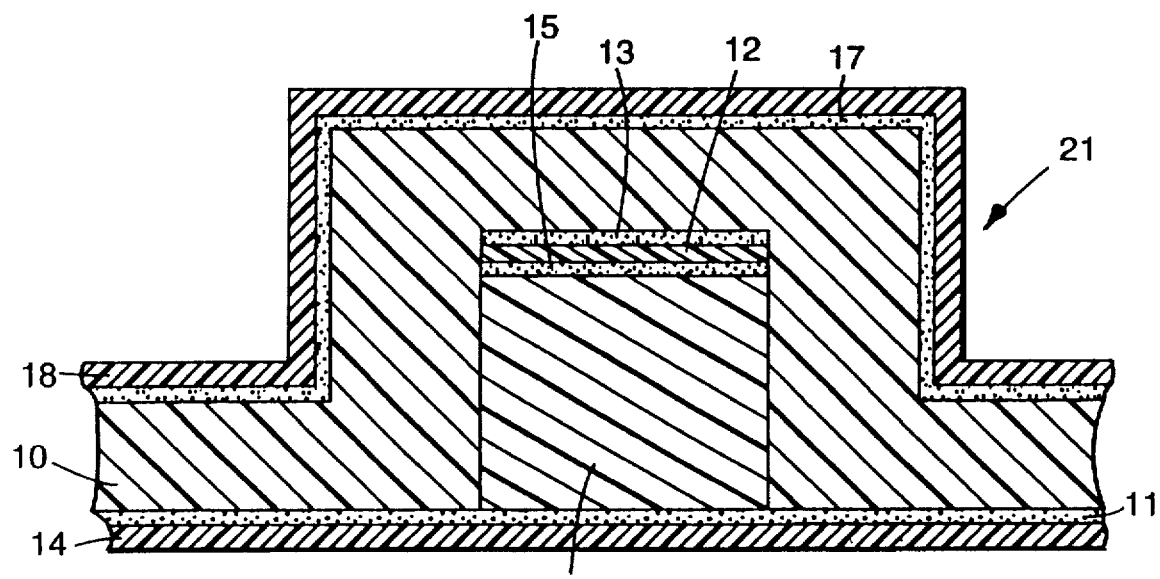
FIG. 4 is a cross-sectional view of the sign face construction with the alphanumeric character of FIG. 3 after being thermally conformed and having background color layer applied.

Although FIGS. 1, 2, and 4 illustrate an adhesive layer between sign face layer 10 and a visual character 12, sign face layer 10 and background color layer 14 and sign face layer 10 and surface modifying layer 18, such layers are optional, although such layers are preferred. Furthermore, one or more visual characters and/or background color layer may be screen-printed, painted or otherwise applied to either the first surface of the background color layer or the second surface of the sign face layer.

In a preferred embodiment, sign face layer (10) is semi-rigid or rigid conformable thermoplastic sheeting having a thickness in the range of 1–25 mil (0.03–0.64 mm), preferably 10–20 mil (0.25–0.51 mm) thickness, and provides a rigid and unitized construction of the entire face of the sign. Although a flexible material could be used for some applications, the sign face would not be as durable or retain formed Braille or other formed textures. It is usually transparent in order to see the contrasting color layers below, although it could be colored. It also can provide gloss control by virtue of fillers, surface roughness, or coatings. To make the sign face durable, the thermoplastics typically have a Shore D hardness that is greater than 50, preferably greater than 65 or a Shore C hardness that is greater than 75, preferably greater than 85. Thermoplastics that soften and conform below about 149° C. (300° F.) afford visually acceptable signs without poor conformation around 3-D characters during moderate temperature of processing (less than about 177° C., 350° F.) or blistering of the materials at high temperatures (greater than about 350° F.). Nonlimiting examples include modified polyesters, polyvinylchloride and copolymers of polyvinylchloride, cellulose acetate butyrate, polystyrene, and the like.

The visual character (12), (a first color layer) is preferably a conformable film material having a thickness in the range 1–5 mils (0.03–0.13 mm), having an essentially transparent PSA layer and cuttable using an electronic cutter. The material selected should be conformable but should not deteriorate at processing temperatures. Such materials can provide numerous color selection and consistency. Nonlimiting examples include polyvinylchloride such as that commercially available from SCOTCHCAL Series 220. If the first cut visual character (12) is not used, the raised characters could be formed without color or contrast differentiation in both embodiments, the 3-D character (16) or adhesive layer (15) would provide the color of the raised character. However, it is within the scope of the present invention, and particularly in the alternative embodiment to eliminate the use of the visual characters, relying on the color of the 3-D characters (that is, the 3-D material) to provide a color contrast to the background color layer.

The background color layer (14) can be a colored or patterned layer and preferably is coated with an essentially transparent PSA layer. For the first embodiment, the background color layer (14) should be conformable, so as conform around the 3-D characters, although conformability is not required for the alternative embodiment. The material may be opaque, translucent, or transparent. Such materials can provide numerous color and pattern selection, as well as consistency. Examples include SCOTCHCAL Series 220, SCOTCHCAL Series 3630 translucent film, DINOC patterned film, and SCOTCHPRINT design films. Alternatively, background color layer (14) could be wet applied ink or paint film such as commercially available as PANAFLEX Paint on Paper Series 820. Furthermore, is it permissible to use no background color layer. For example, a sign prepared without such a background color layer could be adhered directly onto a colored plate or applied to a wall or window.

The 3-D character layer (16) may be fabricated on an electronic cutter using cuttable PSA-backed film materials having a thickness in the range of 10 to 50 mils (0.25–1.27 mm), wherein the material can withstand the processing temperatures without appearance or structural degradation. Such materials typically produce raised characters having a minimum height of 10 mils. Generally, the stroke width to tactile height of the 3-D characters should not exceed 1.4, although this ratio may be variable with the cuttable material used. In the first embodiment, the color or appearance of this material is not critical because the background color layer (14) as illustrated in FIGS. 1 and 2 overlays and hides this layer. Furthermore, many imperfections cut into this character layer may be masked by the laminate layers (10, 12, 14 and 18) conformed around it.

The 3-D character layer functions effectively as a "mold" for the characters, and because the characters remain in the final 3-D sign, the 3-D character "mold" provides reinforcement, strength and durability, that is, the finished 3-D characters are not easily pushed in on themselves. In the first embodiment, it is contemplated the 3-D character "molds" could be removed after the forming step to afford hollow characters, although this is not preferred. Such a configuration would not afford the additional strength of the "filled" 3-D characters. When typical computer assisted knife cutters are used for fabrication, the material should be soft enough to cut. A particularly suitable material is a filled rubber material and such nonlimiting examples include 3M "Letterperfect" #511 (45 mil thick) or #521 (35 mil thick) film, and 3M SCOTCHCAL Series 7795 High Profile film (35–40 mil thick). Some other suitable materials include microporous polymers such as Teslin from PPG, plasticized PVC, etc.

Alternatively, it is considered to be within the scope of this invention that 3-D characters could be fabricated from such techniques as injection molding, routing, laser cutting, casting, etc.

An optional surface modifying layer (18) is a thermally conformable film layer that when used, is applied prior to thermal processing to conformably shape layers (10, 12 and 14) around the 3-D character layer (16) and can be used to provide a variety of special surface effects. A particularly useful example of such a layer is a PSA-backed vinyl film (1–4 mils, 0.03–0.10 mm), such as 3M SCOTCHCAL 210-314 film. The surface modifying layer (18) can provide durability, dirt and vandal resistance, in addition to modifying the surface of the 3-D sign. The surface modifying layer is conformable under processing conditions and has a thickness in the range of 0.25–15 mils (0.01–0.38 mm), preferably in the range of 0.5–10 mils (0.01–0.25 mm), more preferably in the range of 1–6 mils (0.03–0.15 mm). The surface modifying layer can be transparent, translucent, or opaque. To provide a durable sign face, the optional layer typically has a Shore C or D hardness in the same ranges as the sign face layer. For example, it is often desirable for the surface modifying layer to have a matte finish. Nonlimiting examples of suitable surface modifying layers include vinyl (for example, commercially available from 3M as SCOTCHCAL 3669 or 210-314 film), polyvinylidene fluoride acrylic laminate film, polyethylene, cast polypropylene, cast polystyrene, and the like. Although, adhesive backing films are preferred, fluid coatings, such as, for example, clear coats typically used in screen printing techniques, may be alternatively applied onto the surface of the sign before or after processing.

The 3-D signage (20) of the present invention is typically laminated using three adhesive layers, and optionally four adhesive layers. All the adhesive layers may or may not be a continuous layer. A first adhesive layer (13) is between sign face layer (10) and visual character layer (12), a second adhesive layer (11) is between the sign face layer (10) and the background color layer (14), and the third adhesive layer (15) is between the background color layer (14) and 3-D character layer (16). The optional adhesive layer (17) is between the sign face layer (10) and the surface modifying layer (18). In the alternative embodiment of the 3-D signage (21), the background color layer (14) is applied after the sign face layer (10), visual character layer (12) and 3-D character layer (16) have been laminated and conformed as illustrated in FIGS. 3 and 4. Adhesive layers in the alternative embodiment can be present as illustrated in FIGS. 3 and 4.

Suitable adhesives typically have a 180° peel test strength of 1–6 lb/inch as described in ASTM D 3330-87 (Peel Adhesion of Pressure-Sensitive Tape at 180 Degrees Angle). The preferred adhesives are pressure sensitive adhesives, that is, an adhesive that develops sufficient bonding power by applying only a light pressure. The adhesive systems include pressure sensitive adhesives, thermoplastic (heat activated), cross-linking adhesive system, or other types of adhesive systems to bond the various layers to provide more durability. As described above, an sign face film can be fastened to the background color layer using a thermoplastic adhesive bond. Optionally, an adhesion enhancer or primer may be applied to one or both bonding surfaces to enhance adhesion.

Although the preferred embodiment is described using several layers of adhesive-backed conformable sheeting, it is within the scope of the present invention that the visual characters and/or the background color layer may be provided by a paint and mask technique, screen printing process or, using a color transfer process with a heat vacuum lamp applicator, such as described in U.S. Pat. No. 4,737,224 (Fabbrini et al.) and the like, with the proviso, the process used to provide the flat graphic sign (pre-conformable sign, that is, layers 10 to 14 inclusive) are such that the 3-D characters can be positioned in register with the visual characters.

Method of Construction

A general process for making a 3-D sign construction of the first embodiment comprises:

(1) reverse cutting the visual alphanumeric and design characters (12) on a computer-assisted (CAD-CAM) electronic cutter such as a Gerber IVA, IVB, or Supersprint;

(2) weeding and premasking the reverse cut visual characters;

(3) reverse cutting the 3-D characters (16) using the same font and style and with similar dimensions and spacing as the visual characters that are to be raised;

(4) weeding and premasking the reverse cut 3-D characters;

(5) applying the visual characters to a second surface a sign face layer;

(6) removing the premask;

(7) applying a background color layer over the applied visual characters on the same back surface of the sign face layer effectively sandwiching the visual characters between the sign face layer and the background color layer;

(8) optionally, applying a surface modifying layer (18), to the sign face layer on the surface opposite the background color layer effectively sandwiching the sign face layer and the background color layer;

(9) applying the premasked 3-D characters onto the background film in registration with the outline of the visual characters

(10) removing the premask;

(11) positioning the laminate of step 10 onto a vacuum table, wherein the first surface of the sign face is away from the surface of the vacuum table, and applying a vacuum to the table; and

(12) applying heat up to a temperature of 177° C. to the first surface of the sign face, until the background color layer, visual character layer, sign face layer and optional surface modifying layer has conformed around the 3-D characters.

The preparation of the alternative embodiment can be simplified such that steps (1) and (3) can be combined and steps (2) and (9) are eliminated. Further, the background color layer of step (7) is applied after the sign face layer and characters have been conformed. This can be accomplished by preparing a laminate of the materials used for the visual characters and the 3-D characters and then cutting and weeding the laminate to provide 3-D laminate characters. This provides a superior registration.

Some nonlimiting alternatives to fabricating 3-D laminate characters described include:

(a) cutting the visual character and the 3-D character separately and laminating them together in registration prior to applying them to the second surface of the sign face layer, or (b) cutting the visual character and the 3-D character separately and applying them sequentially in registration to the second surface of the sign face layer.

The background surface of the sign, that is the area other than where the alphanumeric characters are, can be modified by placing a porous (either through- or laterally porous) mat on the vacuum table. The porous mat can be used to modify the surface as well as a processing aid, and is generally not part of the finished 3-D sign. While a vacuum is being pulled on the sign face construction, heat is applied to the front face using, for example, a heat gun. While it is possible to thermally conform a sign face using only 1 to 5 in. Hg, it is generally preferred to use a vacuum of greater than 10 in. Hg. A temperature of 177° C. (350° F.) at the sign face has been found to be useful. Temperatures above about 165° C. (300° F.) tend to degrade the integrity and appearance of the layers, that is, the laminate of the optional surface modifying layer, the sign face layer, the visual character, and the background color layer. The thermal process conforms the softened laminate around the 3-D characters. Generally, the processing time is dependent on a number of factors, including the sign face size, the sign face temperature, the vacuum pressure, the thermoplastic and thickness used for the sign face layer. While the processing times are not set for a specific sign size because of the various factors, the processing times are much faster than other sign fabricating techniques, such as vacuum molding, routing, acid-etching and the like.

In an alternative process version, the sign face can be preheated in a frame under heating elements until the thermoplastic of the laminate softens. The sign is then lowered quickly onto a vacuum table, whereupon a vacuum is immediately applied using a vacuum surge tank. After cooling, the finished 3-D sign construction may be mounted on a sign plate using, for example, transfer adhesive.

Advantageously, cuttable mold or cuttable dry back-fill material becomes an integral part of the finished sign construction and provides reinforcement to the 3-D alphanumeric characters. These cuttable molds provide a processing advantage because the molds are cuttable using computer assisted (CAD/CAM) electronic film cutters and the use of the computer-assisted (CAD/CAM) electronic cutter guarantees correct sizing and registration of the visual and 3-D characters. Custom (CAD/CAM) cutting also permits design flexibility in producing the characters, as well as custom logos or designs.

Layout and design flexibility of this system provides numerous variations. Fine dimensional and color definition of small font sizes is readily achieved (unlike vacuum formed signs). By considering the stroke width and the tactile height of the 3-D characters relative to the stroke width of the visual characters to which they are aligned, the visual character may be entirely raised, raised with sloping vertical sides, or flat with a central portion of the strokes raised.

The raised dimensions may be adjusted by layering cut characters of different thicknesses. For example, addition of 3-D characters or 3-D laminate characters can be repeated with more than one layer of 50 mil 3-D characters, thereby achieving the raised character dimensions beyond the 50 mils typically obtained with a single layer of thick film material. Layering may also be repeated with 3-D characters and/or 3-D laminate characters that are not in exact register with the first applied 3-D layer in order to provide a multi-dimensional raised 3-D effect. When using multiple layers, it is often preferable to process each layer one at a time, that is, thermally conform the sign face layer around each layer separatel, then add another layer and conform repeating this process until all the layers have been added. In another version, recessed characters may be formed.

Additionally, Braille can be incorporated directly as an integral part of the unitized sign face (e.g., by placing solid Braille dots or pinheads under the lowest layer prior to thermal processing or by direct embossing after the thermal processing step).

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

EXAMPLES

Indent Resistance Test

The sign is placed on an electronic balance (identify), the mass reading tared to zero, and the round shaped end (16 mm diameter) of a 20 mil thick flat metal stainless steel spatula is pressed vertically onto the raised character of the sign face until a reading of 1500 grams is registered. The length of the indent is microscopically determined. This test creates about a 6.0 mm indent in the unprotected cuttable filled rubber material (3-D character - layer 16) used in the examples.

Example 1

A 3-D graphic sign construction with raised characters was prepared. Alphanumeric visual characters having 25 mm font height were cut in reverse from 3 mil PSA-backed colored flexible vinyl film (available from 3M under the trade name SCOTCHCAL 220 Series electronic cutter film) using an electronically addressable vertical cutting Gerber drum cutter. The same entered font data was used for cutting 40 mil PSA-backed filled rubber material (3-D characters) (available from 3M under the trade name "Letterperfect" No. 521). Using a transfer tape (premask), the visual characters were applied to the second surface of 20 mil transparent glycol modified polyethylene terephthalate (PETG) plastic sheet (available from Lustro Plastics Co., Evanston Ill.) using a roll laminator. Then a 3 mil PSA-backed background color film (available from 3M under the trade name SCOTCHCAL 220 Series film) was applied over the second surface of the plastic sheet (sign face layer) and visual characters. The laminate was placed, first surface down, onto a light table, and using a transparent transfer tape, the PSA-backed filled rubber material (3-D characters) was applied onto the exposed background color film in registration with the shadow of the visual characters seen through the colored background film.

Air permeable smooth TAG paper board was placed on a vacuum table, and the laminate was placed, plastic sheet face up (first surface side of the sign face layer was away from the vacuum table), on top of the TAG board. The edges of the laminate were sealed with tape onto the table such that vacuum could be applied under the laminate. With a vacuum gauge reading of about 25 inches of mercury on the vacuum stage, the air exposed side of the laminate was heated with a Master heat gun Model HG501-A at its lower temperature setting. The nozzle of the heat gun was moved in a slow back-and-forth motion about 25 to 50 cm above the laminate to provide sufficient temperature to conform the laminate over and around the sides of the filled rubber material layer (5 to 30 seconds). Using thermal indicating strips in one sign forming process, the sufficient temperature was determined to be around 120° C.

Removal of the processed laminate from the stage afforded a visually appealing glossy unitized color 3-D sign construction with well defined colored characters raised approximately 42 mm above the sign face background surface. The Indent Resistance Test applied to the front face of the sign on top of a raised character created only a slight 0.7 mm scratch. When viewed from the back, the laminate had smoothly conformed around the retained vertical cut sides of the filled rubber material. The cut filled rubber material was pried away from one character of the sign. This sign character was then much less resistant to deformation by hand applied pressure.

Examples 2–14

Three dimensional sign constructions were made according to the method described in Example 1 and Example 21 using different thermoplastic sheets. All the examples used 35 mil thick PSA-backed filled rubber material for the 3-D characters. A process temperature of about 120° C. was used.

The raised characters of the finished sign were evaluated qualitatively for sufficient and uniform conforming of the structural sign face layer and by the Indent Resistance Test.

TABLE 1

| Example | Thermoplastic Sheet | Thickness (mils) | Thermal Conformability | Indent Resistance |
|---|---|---|---|---|
| 2 | rigid PETG[1] | 15 | excellent | slight 1.5 mm scratch |
| 3 | rigid PETG | 10 | excellent | 3.0 mm |
| 4 | rigid PETG | 5 | excellent | 4.0 mm |
| 5 | rigid APET | 15 | excellent | slight 1.6 mm scratch |
| 6 | rigid APET[2] | 10 | excellent | 2.8 mm |
| 7 | rigid APET | 5 | excellent | 3.6 mm |
| 8 | rigid PVC | 20 | excellent | slight 0.7 mm scratch |
| 9 | rigid PVC[3] | 15 | excellent | slight 0.7 mm scratch |
| 10 | rigid PVC | 10 | excellent | 2.4 mm |
| 11 | flexible PVC | 10 | excellent | 4.6 mm |
| 12 | PET | 4 | poor | 2.8 mm |
| 13 | polycarbonate[4] | 7 | poor | 2.5 mm |
| 14 | vinyl[5] | 15 | excellent | 1.8 mm |

[1]glycol-modified PET commercially available from Lustro Plastics, Inc.
[2]amorphous PET commercially available from Lustro Plastics, Inc.
[3]commercially available from Mark Products
[4]commercially available from GE under the tradename of "Lexan"
[5]commercially available from Arlington Mills under the designation "CPM"

Example 15

A three dimensional sign was made according to the method of Example 1. A PSA-backed blue translucent background layer was used (available as 3M SCOTCHCAL 3630 Series Marking Film) to form a 3-D sign. When placed in front of a light source, the translucent background was uniformly backlit. In a similar fashion, the 3-D characters could be backed with translucent film and the background color film backed with an opaque film to permit backlit, 3-D characters.

Example 16

A three dimensional sign was made according to the method of Example 1. Prior to all of the other steps, a 3 mil PSA-backed matte vinyl film (available as 3M SCOTCHCAL 210-314 film) was applied to the first surface of the thermoplastic sign face layer. After processing, a matte 3-D sign with a 60 degree gloss of 6.4 was formed.

Example 17

Three dimensional signs were made according to Example 1 using 35 mil filled rubber material as the 3-D character. Prior to processing, different textured air permeable mats and screens were placed on the vacuum table. After thermal processing of the laminates, visually appealing signs were made having three dimensional surface textures topographically similar to the processing mats or screens on the first surface of the background areas of the sign. For example, a fine screen imparted a crosshatch texture, cloth imparted a fiber-like texture to the background regions, and 3M 100 grit Wetordry™ sandpaper imparted a sandblasted pebble effect.

Example 18

Three dimensional signs were made according to Example 1 using 40 mil filled rubber material as the PSA-backed 3-D character. Multiple copies of this material were electronically cut. After application of this material onto the back of the laminate in registration with the outline of the visual character, another layer of this material was applied onto the first layer. In this fashion, multiple layers of the filled rubber material cut characters were applied on top of each other. The laminates were processed as previously described to afford three dimensional signs having characters with different raised character heights above the background of the sign face (Table 2).

TABLE 2

| Number of Applied Layers of Cut 3-D Characters | Three Dimensional Height of Raised Sign Face Characters |
|---|---|
| 1 | 45 mils (0.04 in) |
| 2 | 82 mils (0.08 in) |
| 3 | 120 mils (0.12 in) |
| 4 | 156 mils (0.16 in) |

Example 19

A three dimensional sign having recessed characters was prepared according to the method of Example 1. The thermoplastic sign face layer was a 15 mil rigid polyvinylchloride. In this process, the 3-D characters from the PSA-backed filled rubber material were removed, and the remaining sheet of the cut filled rubber material was aligned with the shadow of the visual characters seen through the background film. In this sign, the visual background was the raised surface and was reinforced by the filled rubber material layer.

Example 20

A three dimensional sign was made according to Example 17. The background color layer was applied onto 15 mil thermoplastic sign face layer as a sprayed black enamel lacquer (Sprayon Industrial Acrylic Enamel) and air dried. A fine mesh screen was used on the vacuum table. After processing, the background of the finished sign had a black-filled screen-like appearance.

Example 21

This example used an alternative process to produce a 3-D graphic sign construction with visually sharp raised characters. To the top vinyl film side of 3 mil PSA-backed colored vinyl film (available from 3M under the trade name SCOTCHCAL 220 Series electronic cutter film) was laminated the pressure sensitive adhesive side of 35 mil PSA-backed filled rubber film material (3-D material) (available from 3M under the trade name "Letterperfect" No. 521). With the filled rubber material on top, alphanumeric characters having 25 mm font height were cut in reverse into the laminate. Excess laminate was weeded from around the cut characters. Using a transfer tape (prespace tape), the laminate characters were applied to the second surface of thermoplastic film as described in Example 1 using a roll laminator, and the transfer tape was removed.

Air permeable monofilament polyester screen fabric was placed on a vacuum table. The entire sign construction was placed, plastic sheet face up (first surface side of the sign face layer was away from the vacuum table), on top of the screen fabric on the vacuum table. The edges of the sign construction were sealed with tape onto the table such that vacuum could be applied under the sign construction. The sign was thermally processed with vacuum applied as described in Example 1. The processed sign construction was removed from the vacuum table. A 3 mil PSA-backed background color film (available from 3M under the trade name SCOTCHCAL 220 Series film) was laminated behind (second surface application) the formed sign laminate using a roll laminator to afford a visually appealing unitized color 3-D sign construction with exceptionally well defined raised colored characters.

Example 22

A 3-D graphic sign was made having a multi-dimensional raised character effect. This sign construction was made according to the general method of Example 21 with the following modifications. A cuttable laminate was prepared according to the procedure of Example 21, and a heart-shaped 3-D laminate character with 5 inch font height was cut from it. The heart-shaped character was applied to the thermoplastic sheet. Smaller heart-shaped 3-D characters were cut from the 35 mil thick PSA-backed filled rubber material (4 inch font height, 3 inch font height, and 2 inch font height). The 3-D character with 4 inch font height was applied to the central area of the laminate character, which had already been applied to the thermoplastic sheet. In similar fashion, each successively smaller 3-D character was applied to the previously applied 3-D character. The construction was then processed as in Example 21 with the 3-D character layers down towards the vacuum table. The background color film was laminated to the back of the construction using a roll laminator and cushioning the front face of the sign with several layers of paper towels. A visually appealing tactile sign was produced having a large character of one color with succesively higher raised areas protruding from it in a terraced effect.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A 3-D sign face construction comprising:
   (a) a conformed laminate comprising in sequence:
      (1) a sign face layer having a first and a second surface,
      (2) one or more visual characters,
      (3) a background color layer having a first and second surface, and
   (b) one or more 3-D characters having a minimum height of approximately 10 mils and positioned in register with the visual characters.

2. The 3-D sign face construction according to claim 1 further including a surface modifying layer applied to the first surface of the sign face layer.

3. The 3-D sign face construction according to claim 1, wherein the sign face layer is a rigid or semi-rigid thermoplastic that softens and conforms below 121° C.

4. The 3-D sign face construction according to claim 3, wherein the visual characters are cut from a cuttable material having a thickness in the range of 1–5 mils.

5. The 3-D sign face construction according to claim 4, wherein the background color layer is a transparent, translucent, colored or patterned conformable layer.

6. The 3-D sign face construction according to claim 1, further including a first adhesive layer between the sign face layer and the visual characters, a second adhesive layer between the visual characters and the background color layer and a third adhesive layer between the background color layer and the 3-D characters, wherein the first, second and third adhesive layers are a pressure sensitive adhesive having a 180° peel test strength of 1 to 6 lb/inch as described in ASTM D 3330-87.

7. A 3-D sign face construction comprising:
   (a) a conformed laminate comprising in sequence:
      (b 1) a sign face layer having a first and a second surface,
      (2) one or more visual characters,
      (3) one or more 3-D characters positioned in register with the visual characters; and
   (b) a background color layer.

8. The 3-D sign face construction according to claim 7 further including a surface modifying layer applied to the first surface of the sign face layer.

9. The 3-D sign face construction according to claim 7 wherein the sign face layer is a rigid or semi-rigid thermoplastic that softens and conforms below 121° C.

10. A 3-D raised graphic sign comprising in sequence:
    (a) a sign face layer;
    (b) one or more visual alphanumeric and design characters;
    (c) a first background layer;
    (d) one or more 3-D characters having a minimum height of approximately 10 mils and positioned in register with the visual characters; and
    (e) a second background layer.

* * * * *

UNITED STATES PATENT AND TRADEMARK OFFICE
CERTIFICATE OF CORRECTION

PATENT NO. : 5,536,545
DATED : Jul. 16, 1996
INVENTOR(S) : Condon et al.

It is certified that error appears in the above-indentified patent and that said Letters Patent is hereby corrected as shown below:

Title Page, OTHER DOCUMENTS, Please insert the following:
--1992 Annual Book of ASTM Standards, "Peel Adhesion of Pressure-Sensitive Tape at 180° Angle", ASTM D 3330-87, Vol. 15.09
3M Brochure, "Technical Data Safety-Walk Antislip Material" 61-5000-7832-6 RPI
ASTM Standards, "Designation: D 1044-85", pg. 387-390
ASTM Standards, "Designation: D 4060-84", pg. 670-672
Signs of the Times, "Dealing with the ADA", pg. 76-79, January 1992
Sign Business, "ADA Signage: A New Business Opportunity", pg. 52-73, February 1992--

Col. 2, line 49, Insert --(c)-- before "a"
Col. 2, line 50, Insert --(d)-- before "one"
Col. 3, line 32, Delete "(a)" and insert --(b)--
Col. 5, line 3, Delete "a"
Col. 5, line 67, Insert --to-- after "as"
Col. 7, line 37, Delate "an" and insert --a--
Col. 9, line 44, Delete "separatel" and insert --separately--
Col. 13, line 37, Delete "succesively" and insert --successively--
Col. 14, line 30, Delete "(b1)" and insert --(1)--

Signed and Sealed this

Eighteenth Day of February, 1997

Attest:

BRUCE LEHMAN

Attesting Officer        Commissioner of Patents and Trademarks